United States Patent [19]
Krukoski

[11] Patent Number: 4,748,804
[45] Date of Patent: Jun. 7, 1988

[54] INLET TOTAL TEMPERATURE SYNTHESIS FOR GAS TURBINE ENGINES
[75] Inventor: Leon Krukoski, Coventry, Conn.
[73] Assignee: United Technologies Corporation, Hartford, Conn.
[21] Appl. No.: 939,218
[22] Filed: Dec. 8, 1986
[51] Int. Cl.[4] .............................................. F02C 9/00
[52] U.S. Cl. .................... 60/39.03; 60/39.2; 60/39.281
[58] Field of Search ................. 60/39.02, 39.03, 39.06, 60/39.2, 39.27, 39.281, 39.29

[56] References Cited
U.S. PATENT DOCUMENTS

| | | | |
|---|---|---|---|
| 2,809,492 | 10/1957 | Arkawy | 60/39.28 |
| 3,420,056 | 1/1969 | Eames | 60/39.28 |
| 4,058,975 | 11/1977 | Gilbert et al. | 60/39.28 |
| 4,122,667 | 10/1978 | Hosaka et al. | 60/39.09 |
| 4,212,161 | 7/1980 | Newirth et al. | 60/39.281 |
| 4,228,650 | 10/1980 | Camp | 60/39.091 |
| 4,543,782 | 10/1985 | Fitzmaurice | 60/39.281 |
| 4,581,888 | 4/1986 | Schmitzer et al. | 60/39.09 |
| 4,594,849 | 6/1986 | Kenison et al. | 60/39.29 |
| 4,651,518 | 3/1987 | McLaughlin et al. | 60/39.281 |

Primary Examiner—Louis J. Casaregola
Attorney, Agent, or Firm—Stephen E. Revis

[57] ABSTRACT

In a gas turbine engine electronic control system the engine total inlet temperature is synthesized from aircraft Mach number and the nozzle expansion ratio. When the engine is in a transient mode of operation the synthesized value of the total inlet temperature is maintained constant at the value calculated just before entering the transient mode. The synthesized temperature is used when the actual measured temperature is unavailable or unreliable.

11 Claims, 1 Drawing Sheet

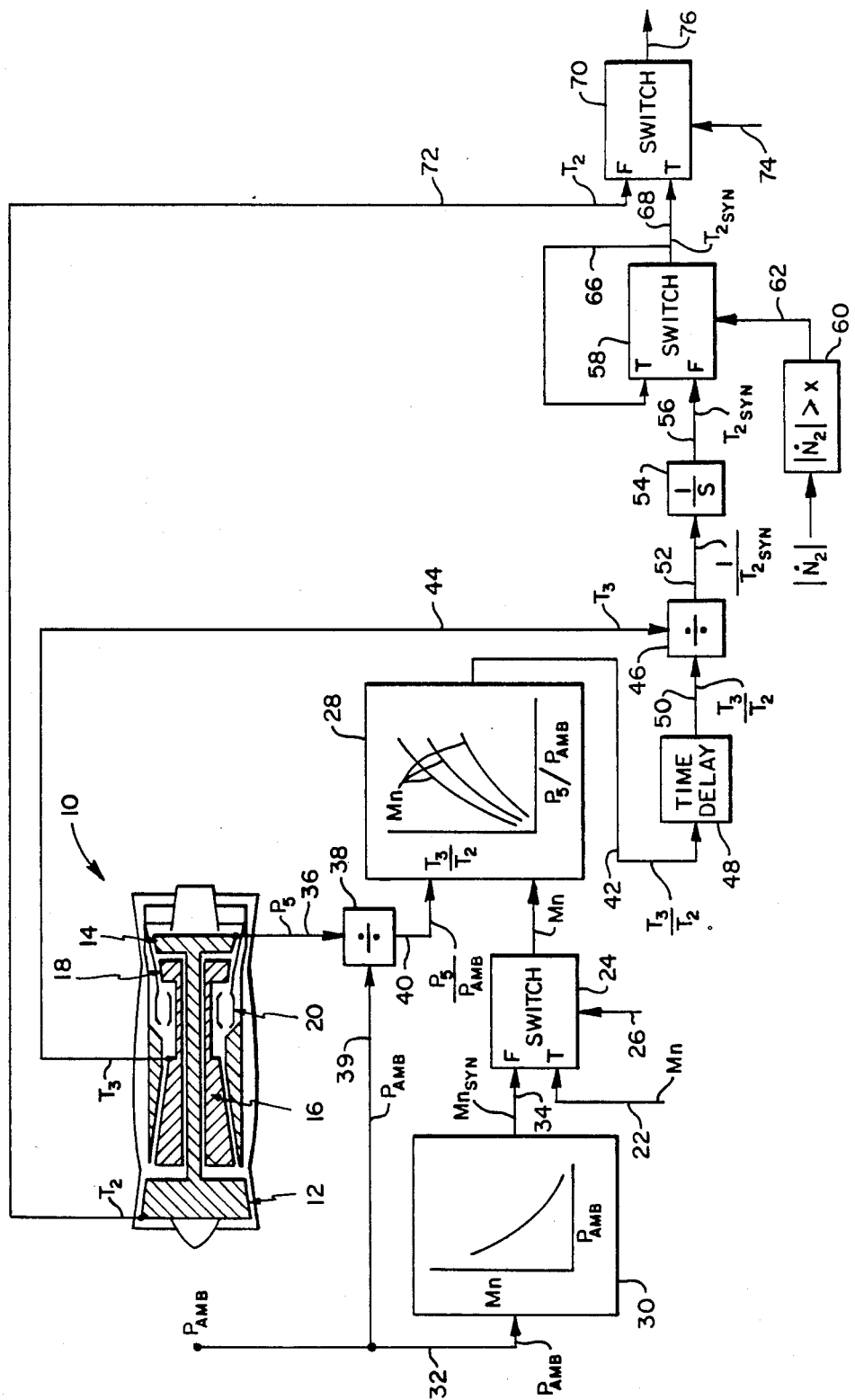

INLET TOTAL TEMPERATURE SYNTHESIS FOR GAS TURBINE ENGINES

DESCRIPTION

1. Technical Field

This invention relates to controls for gas turbine engines and more particularly to synthesizing parameters for use in such controls.

2. Background Art

The most current gas turbine engines utilize electronic controls which automatically regulate engine operation, such as fuel flow rate and compressor bleed position, based upon pilot demand (i.e., throttle position), various aircraft parameters (e.g., aircraft speed and altitude), engine parameters (e.g., burner pressure and exhaust gas temperature), and empirically developed relationships between various parameters. The empirically developed relationships are built into the control in the form of schedules. Considerable redundancy is built into the control system to maintain engine operation as close to normal as possible and to prevent unnecessary engine shutdowns in the event that certain parameters upon which the control primarily depends cannot be accurately determined or calculated, such as due to faulty measuring equipment, circuit malfunction, or for any other reason.

It is well known to generate synthesized values of engine parameters, such as burner pressure, to be used in the event the actual pressure measurement is unavailable or is known to be faulty. One such means for synthesizing burner pressure is described in commonly owned U.S. Pat. No. 4,212,161 to David M. Newirth and Eugene W. Koenig. In that patent burner pressure is synthesized by generating a ratio of burner pressure to total engine inlet pressure from known values of total engine inlet temperature, compressor speed, and an empirically developed relationship therebetween for that particular engine. Similarly, total inlet pressure is estimated from known relationships between aircraft altitude and Mach number. Multiplying the calculated total inlet pressure times the ratio of burner pressure to total inlet pressure yields a synthesized value of the burner pressure.

An important parameter for engine controls is the total inlet temperature to the engine. This is an aircraft parameter as opposed to an engine parameter, such as burner pressure, since inlet temperature is essentially unaffected by engine operation. Generally total inlet temperature is measured at one or more locations at the engine inlet by means of temperature probes. These probes are vulnerable to bird strikes which can damage them. Additionally, ice accumulation within the probes can cause them to generate faulty readings. Until now, if no good reading for the engine inlet temperature can be obtained, the control reverts to an alternate control mode which performs on the basis of the last reliable inlet temperature reading. This may eventually require the engine to be shut down even though the engine may be capable of operating in a perfectly normal fashion. It is desireable to prevent such a shut down and maintain relatively normal engine operation in the event of the lack of or faulty inlet temperature measurements. Note that in the Newirth et al patent discussed above, if engine inlet temperature is faulty, the burner pressure cannot be synthesized.

DISCLOSURE OF THE INVENTION

One object of the present invention is a gas turbine engine control system which synthesizes the value of an aircraft (as opposed to engine) parameter.

Another object of the present invention is a gas turbine engine control system which generates a synthesized value of total engine inlet temperature.

Another object of the present invention is a gas turbine engine control system which uses a synthesized engine total inlet temperature as a control parameter when the actual inlet temperature measurement is unreliable.

According to the present invention, a gas turbine engine control system generates, as a function of aircraft Mach number, a signal which is indicative of a ratio of a measured engine parameter and the engine total inlet temperature, and combines that ratio with a signal indicative of the measured engine parameter to generate an output signal indicative of the approximate value of the engine total inlet temperature.

When it is determined that the measured value of the engine total inlet temperature is unavailable or unreliable, the approximate or synthesized engine total inlet temperature is utilized as the control parameter in place of the measured temperature.

In a preferred embodiment the ratio of the engine exhaust nozzle pressure ($P_5$) to ambient pressure ($P_{amb}$) is used, in conjunction with the aircraft Mach number, in a function generator to produce an empirically developed ratio indicative of the temperature rise from the inlet to the outlet of the compressor ($T_3/T_2$) (In a twin spool engine this would be the temperature rise ratio across both the high and low compressor.) This ratio may then be multiplied or divided, as appropriate, by the measured temperature at the compressor outlet ($T_3$) to yield a synthesized value of the temperture at the compressor inlet ($T_{2syn}$).

If a true Mach number is not available, Mach number is approximated or synthesized from a schedule based upon aircraft altitude.

In accordance with another aspect of the present invention, during engine transients (i.e., acceleration or deceleration) the empirically derived relationship between the temperature rise ratio $T_3/T_2$, Mn and the nozzle expansion ratio $P_5/P_{amb}$ used in the synthesis of the engine inlet temperature is not sufficiently accurate. Since engine inlet temperature $T_2$ is a relatively slow changing parameter, during transient engine modes of operation the control uses the synthesized value of the engine inlet temperature calculated just prior to the engine entering the transient mode.

The foregoing and other objects, features and advantages of the present invention will become more apparent in the light of the following detailed description of a preferred embodiment thereof.

BRIEF DESCRIPTION OF THE DRAWING

The sole FIGURE is a schematic and block diagram of a twin spool gas turbine engine incorporating the control system of the present invention.

BEST MODE FOR CARRYING OUT THE INVENTION

As an exemplary embodiment of the present invention, consider the twin spool gas turbine engine shown in the drawing and generally represented by the reference numeral 10. The engine comprises a low compressor 12 connected through a shaft to a low turbine 14; a high compressor 16 connected through a shaft to a high turbine 18; and a burner section 20 disposed between the high compressor and high turbine. An electronic engine control automatically regulates engine operation, such as fuel flow rate and compressor bleed position, based upon pilot demand, various aircraft and engine parameters, and scientific and empirically developed relationships between various parameters.

In this embodiment the electronic engine control uses the total engine inlet temperature as a key parameter for automatically controlling the engine. One aspect of the electronic engine control is to generate a synthesized value of the total engine inlet temperature for use in the event of the unavailability or unreliability of an actually measured inlet temperature. It is that portion of the electronic engine control which is shown in the drawing. Referring to the drawing, a signal 22 indicative of the airplane Mach number is delivered to a switch 24. Mach number is typically determined by measuring the compressor inlet pressure by means of a probe and then calculating the Mach number through a known scientific relationship between Mach number and pressure. A signal 26 is delivered to the switch if it is determined, by means not shown, that the pressure measurement used to generate the Mach number is available and reliable. In that case the signal 22 is passed through the switch 24 to a function generator 28.

As protection in the event that the measured Mach number (i.e., engine inlet pressure) is unavailable or unreliable, a synthesized value of the Mach number is generated by a function generator 30 as a function of ambient pressure $P_{amb}$, which is measured and delivered to the function generator via the line 32. A signal 34 indicative of this synthesized Mach number is delivered from the function generator 30 into the switch 24 and is passed through to the function generator 28 when no signal 26 is being sent to the switch indicating that the Mach number signal 22 is either unavailable or unreliable.

The engine exhaust pressure $P_5$ is measured and a signal 36 indicative thereof is provided to a divider 38 along with a signal 39 indicative of $P_{amb}$. The divider generates a signal 40 which is the ratio of $P_5$ to $P_{amb}$, which ratio is generally referred to as the nozzle expansion ratio. The function generator 28 generates a signal 42 indicative of the ratio of the temperature rise across the compressors 12, 16. That ratio is herein designated as $T_3/T_2$. That signal is ultimately delivered to a divider 46 as the numerator thereof.

The actual high compressor outlet temperature $T_3$ is measured and a signal 44 indicative thereof is also sent to a divider 46 as the denominator thereof. Because of the time it takes for a temperature probe to respond to temperature changes, the value of $T_3$ delivered into the divider 46 will be the temperature which existed shortly before that temperature value was delivered to the divider 46. Therefore, the temperature rise ratio signal 42 is passed through a device 48 which has a built-in time delay such that the temperature rise ratio signal 50 delivered therefrom into the divider 46 is the temperature rise calculated at the time the temperature $T_3$ delivered into the divider 46 was actually measured. Such time delays are well known in the art for many applications in control systems.

The actual $T_3$ is assumed to cancel the $T_3$ in the ratio $T_3/T_2$. Thus, the divider 46 delivers a signal 52 indicative of the inverse of the approximate total engine inlet temperature. This signal is passed through a calculator 54 which calculates the inverse of the value of the signal 52, thereby producing a signal 56 indicative of the approximate or synthesized total engine inlet temperature $T_{2syn}$. The signal 56 is delivered to a switch 58.

Because the relationships between the temperature rise ratio, nozzle expansion ratio, and Mach number used in the function generator 28 are unreliable during engine accelerations and decelerations greater than certain minimum values, the temperature rise ratio 42 generated by the function generator 28 calculated during such transient engine operations are not used. In this embodiment the high rotor speed derivative $\dot{N}_2$ is calculated or otherwise determined, and its absolute value is delivered into a threshhold detector 60. If the high compressor speed is changing at a rate greater than a predetermined value x, then a positive or true signal 62 is delivered to the switch 58. Otherwise no signal is sent to the switch. In the event of a signal 62, the output of switch 58 is a signal 66 which is indicative of the value of the synthesized temperature signal 56 last calculated prior to the signal 62 being positive (i.e., before the engine went into the transient mode of operation). And that signal 56 is maintained constant until the signal 62 ceases. When no signal 62 is present the switch 58 simply passes the presently calculated value of signal 56.

The signal 68 is indicative of the synthesized value of the inlet temperature passed by the switch 58, and is delivered into another switch 70 along with a signal 72 indicative of the actual total engine inlet temperature $T_2$ as measured by a probe at the inlet to the low compressor 12. Via means not shown it is determined whether the measured temperature signal 72 is either unavailable or unreliable. If the answer is "yes", a positive or true signal 74 is delivered to the switch 70, and the switch output signal 76 will be the synthesized total inlet temperature signal 68. Otherwise, the switch output signal 76 will be the actual measured temperature signal 72. In either case, the signal 76, whether indicative of the actual or synthesized inlet temperature, is the signal used as a control parameter in the electronic engine control.

It should be noted that the temperature rise ratio $T_3/T_2$ is not the only temperature ratio which may be used in the present invention. Any temperature ratio which includes $T_2$ and which can be calculated from empirical relationships between it, the aircraft Mach number, and other determinable parameters, such as nozzle expansion ratio or the like, may be used. That temperature ratio would thereupon be either divided or multiplied by the appropriate measured temperature to yield either the synthesized turbine inlet temperature or its inverse, as the case may be.

Although the invention has been shown and described with respect to a preferred embodiment thereof, it should be understood by those skilled in the art that other various changes and omissions in the form and detail of the invention may be made without departing from the spirit and scope thereof.

I claim:

1. For a gas turbine engine powering an aircraft, the engine having a compressor, a burner, and turbine, a control system comprising means for synthesizing the engine total inlet temperature $T_2$ including:

means for detecting an engine temperature T other than $T_2$ at which said engine is operating and producing a first signal indicative thereof;

means for generating a signal indicative of the Mach Number Mn of the aircraft;

a first function generator responsive to said Mach number signal for generating a second signal empirically indicative of a ratio of the temperature T and the engine inlet temperature $T_2$ at the indicated Mn; and means for combining said first signal and said second signal to generate an output signal indicative of an approximate value of $T_2$ ($T_{2syn}$).

2. The control system according to claim 1 wherein T is the compressor discharge temperature $T_3$, and the empirical ratio is either $T_3/T_2$ or $T_2/T_3$.

3. The control system according to claim 1 including means for detecting the engine exhaust pressure $P_5$ and the ambient pressure $P_{amb}$ and calculating the expansion ratio $P_5/P_{amb}$, wherein said first function generator is responsive to the ratio of $P_5/P_{amb}$.

4. The control system according to claim 3 wherein T is the compressure discharge temperature $T_3$.

5. The control system according to claim 4 including first switch means for receiving said first signal indicative of detected $T_2$ and said output signal indicative of $T_{2syn}$, and for receiving a third signal indicative of whether $T_2$ is available and reliable, said first switch means including means for delivering an output signal indicative of $T_2$ when said third signal indicates $T_2$ is available and reliable for delivering an output signal indicative of $T_{2syn}$ when said third signal indicates $T_2$ is either not available or not reliable.

6. The control system according to claim 5 including:

second switch means for receiving said signal indicative of $T_{2syn}$ from said function generator means and for passing therethrough, to said first switch means, a signal indicative of $T_{2syn}$; and means for delivering to said second switch means a third signal indicative of whether or not the compressor is accelerating or decelerating faster than a predetermined value, wherein said second switch means includes means for passing therethrough, during the period of time said third signal indicates the compressor is accelerating or decelerating, a constant value signal of $T_{2syn}$ indicative of the last value of $T_{2syn}$ delivered to said second switch means prior to said period of time.

7. In the method for controlling a gas turbine engine which powers an aircraft, the engine having a compressor, a burner and a turbine, the method for synthesizing the engine total inlet temperature $T_2$ comprising the steps of:

detecting a temperature T within the engine, other than $T_2$, and producing a first signal indicative thereof;

generating a signal indicative of the Mach Number Mn, of the aircraft;

generating a second signal as a function of the Mach number signal and the first signal, said second signal being empirically indicative of a ratio of the temperature T and the engine total inlet temperature $T_2$ at the indicated Mach number; and combining said first signal and said second signal to generate an output signal indicative of the approximate value of $T_2$ ($T_{2syn}$).

8. The method for controlling a gas turbine engine according to claim 1 wherein the temperature T is the compressor discharge temperature $T_3$.

9. The method of controlling the gas turbine engine according to claim 7 including the step of detecting the nozzle expansion ratio, wherein said step of generating a second signal includes generating said second signal as a function of the nozzle expansion ratio.

10. The method for synthesizing the engine total inlet temperature according to claim 9 wherein the temperature T is the compressor discharge temperature $T_3$.

11. The method of synthesizing the engine total inlet temperature according to claim 10 including the step of determining whether the engine is accelerating or decelerating greater than a predetermined rate, and maintaining the synthesized value of the engine total inlet temperature constant when the engine is accelerating or decelerating faster than said predetermined rate, the constant value being held at the last value of the synthesized engine total inlet temperature prior to the engine accelerating or decelerating faster than the predetermined rate.

* * * * *